United States Patent
Hente et al.

(10) Patent No.: US 9,929,598 B2
(45) Date of Patent: *Mar. 27, 2018

(54) INDUCTIVE POWER SUPPLY SYSTEM

(71) Applicant: KONINKLIJKE PHILIPS N.V., Eindhoven (NL)

(72) Inventors: Dirk Hente, Aachen (DE); Joseph Hendrik Anna Maria Jacobs, Aachen (DE); Elena Tiziana Ferrari, Eindhoven (NL); Ramon Rascal Van Gorkom, Eindhoven (NL); Petrus Johannes Bremer, Eindhoven (NL); Bertrand Johan Edward Hontele, Eindhoven (NL); Robert Cornelis Houtepen, Eindhoven (NL); Joris Jan Vrehen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 254 days.

This patent is subject to a terminal disclaimer.

(21) Appl. No.: 14/833,511

(22) Filed: Aug. 24, 2015

(65) Prior Publication Data

US 2015/0364930 A1 Dec. 17, 2015

Related U.S. Application Data

(63) Continuation of application No. 13/806,187, filed as application No. PCT/IB2011/052583 on Jun. 15, 2011, now Pat. No. 9,147,523.

(30) Foreign Application Priority Data

Jul. 2, 2010 (EP) .................................. 10168246

(51) Int. Cl.
*H02J 7/02* (2016.01)
*H02J 50/10* (2016.01)
(Continued)

(52) U.S. Cl.
CPC ............. *H02J 50/10* (2016.02); *B60L 11/182* (2013.01); *B60L 11/1824* (2013.01);
(Continued)

(58) Field of Classification Search
CPC .. H02J 5/005; H02J 50/00; H02J 50/10; H02J 50/60; H02J 50/80; H02J 50/90; H02J 7/025; H02J 7/0044
(Continued)

(56) References Cited

U.S. PATENT DOCUMENTS 6,803,744 B1 10/2004 Sabo
7,026,789 B2 4/2006 Bozzone
(Continued)

FOREIGN PATENT DOCUMENTS

CN 101233666 A 7/2008
CN 101488676 A 7/2009
(Continued)

OTHER PUBLICATIONS http://www.wirelesspowercompanies.com, Jul. 21, 2009.

*Primary Examiner* — John Poos
(74) *Attorney, Agent, or Firm* — Larry Liberchuk

(57) ABSTRACT

A power supplying device is provided for providing electrical power to a power receiving device, the power supplying device comprising two plates, two electrode structures being arranged to be coupled to an AC power source and at least one power transmitter. Each electrode structure is attached to one of said two plates. The power transmitter is situated in between the two plates and comprises an electrically conductive coil and at least two electrical contacts coupled to the electrically conductive coil. The plates and the power transmitter are arranged such that the power transmitter is movable in a direction parallel to the surfaces of the plates with the electrical contacts in contact with the
(Continued)

respective two electrode structures for obtaining power from the AC power source.

2 Claims, 7 Drawing Sheets

(51) Int. Cl.
  *H01F 38/14* (2006.01)
  *H02J 5/00* (2016.01)
  *B60L 11/18* (2006.01)
  *H02J 7/00* (2006.01)
  *H02J 50/40* (2016.01)
  *H02J 50/90* (2016.01)
  *H02J 17/00* (2006.01)

(52) U.S. Cl.
  CPC .......... *B60L 11/1829* (2013.01); *H01F 38/14* (2013.01); *H02J 5/005* (2013.01); *H02J 7/0042* (2013.01); *H02J 7/025* (2013.01); *H02J 50/40* (2016.02); *H02J 50/90* (2016.02); *B60L 2230/16* (2013.01); *H02J 17/00* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
  USPC .......................................................... 307/104
  See application file for complete search history.

(56) References Cited

U.S. PATENT DOCUMENTS

| | | |
|---|---|---|
| 2007/0182367 A1 | 8/2007 | Partovi |
| 2008/0164839 A1 | 7/2008 | Kato |
| 2009/0096413 A1 | 4/2009 | Partovi |
| 2009/0121675 A1 | 5/2009 | Ho |
| 2010/0007215 A1* | 1/2010 | Sakuma .................. H01F 38/14 307/104 |
| 2010/0295378 A1 | 11/2010 | Suzuki |

FOREIGN PATENT DOCUMENTS

| | | |
|---|---|---|
| JP | 2005006440 A | 1/2005 |
| WO | WO2008093334 A2 | 8/2008 |
| WO | WO2009047768 A2 | 4/2009 |

* cited by examiner

INDUCTIVE POWER SUPPLY SYSTEM

FIELD OF THE INVENTION

This invention relates to a power supplying device for providing electrical power to a power receiving device, the power supplying device comprising two plates, at least one power transmitter situated in between the two plates and comprising an electrically conductive coil coupled to an AC power source for obtaining power therefrom, the plates and the power transmitter being arranged such that the power transmitter is movable in a direction parallel to the surfaces of the plates.

This invention further relates to a power receiving device for cooperation with the power supplying device according to the invention.

The invention also relates to a power consuming system, comprising both the power supplying device and the power receiving device.

BACKGROUND OF THE INVENTION

Such a power supplying device is, e.g., known from the United States patent application US 2007/0182367 A1. Said patent application describes a portable inductive power device for charging battery operated electronic devices. The power device uses a pad with an array of coils and an AC power source to create an alternating magnetic field. The alternating magnetic field is used for charging the electronic device lying on the pad, close to the AC powered coils. In an embodiment (FIG. 16), each coil in the array has its own little segment within which it is free to move laterally. Thus, this embodiment may be considered to use an array of fixed coil segments instead of an array of fixed coils. The coils may comprise a permanent magnet for controlling the lateral movements.

One of the problems of this known power supplying device is that it needs a lot of coils and corresponding driving electronics. Each coil is connected to a power source with a wire, which restricts the freedom of movement for the coil and limits the possibilities to use multiple coils in combination. These problems make the known device less suitable for use in large area applications. For a charging apparatus for portable electronic devices, the area size may not be very important, but for other applications scalability may be an important aspect. For example, a table or wall surface capable of supplying power to a freely movable lamp may be quite large. When applying the known technology to an entire wall, a lot of coils and additional electronics are required.

SUMMARY OF THE INVENTION

According to a first aspect of the invention, this object is achieved by providing a power supplying device for providing electrical power to a power receiving device, the power supplying device comprising two plates, two electrode structures being arranged to be coupled to an AC power source and at least one power transmitter. Each electrode structure is attached to one of said two plates. The power transmitter is situated in between the two plates and comprises an electrically conductive coil and at least two electrical contacts coupled to the electrically conductive coil. The plates and the power transmitter are arranged such that the power transmitter is movable in a direction parallel to the surfaces of the plates with the electrical contacts in contact with the respective two electrode structures for obtaining power from the AC power source.

In the power supplying device according to the invention, the plates have two important functions. First, the plates define the freedom of movement for the coil, such that the coil is free to move (in two dimensions) within a gap between the two plates. Additionally, the plates provide the electrical coupling between the coil and the power source. When the power transmitter moves through the gap between the plates, the electrical contacts slide along and keep in contact with the electrode structures. As a result, the inductive coil is powered by the AC source independently of the position of the coil. No additional electronics are needed for finding out the exact position of the coil and the coil does not have to be coupled to the AC source by a wire which may become entangled when the coil moves through the gap.

In an embodiment of the power supplying device according to the invention, each one of the two plates comprises a respective one of the two electrode structures, said two electrode structures facing each other.

In this embodiment, one of the electrical contacts of the power transmitter will be in contact with the electrode structure of the top plate and another electrical contact of the power transmitter will be in contact with the electrode structure of the bottom plate. The respective electrode structures are coupled to different terminals of the AC power source. The electrode structures may be conductive layers covering large parts of the plate surfaces.

In a different embodiment, both electrode structures are attached to the same one of the two plates, the two electrode structures being electrically separated. Hence, only one of the plates needs conductive material. The terminals of the AC power source are coupled to the respective electrode structures. In this embodiment it is important that the electrical contacts of the power transmitter are arranged such that, independently of the position of the power transmitter relative to the plates, one electrical contact cannot contact both electrode structures at once, which would lead to short circuiting. It is also important that in many positions (not necessarily all positions) of the power transmitter, the electrical contacts are situated such that the coil is coupled to both electrode structures in order to enable the AC power to be provided to the coil.

According to a further aspect of the invention, a power receiving device is provided for cooperation with a power supplying device as described above, the power receiving device comprising at least one power receiver with an electrically conductive coil. When such a power receiving device is placed on or close to the power supplying device, the electrically conductive coil uses the alternating magnetic field produced by the power supplying to pick up power. The picked up power is then used to power the power receiving device. By moving the power supplying device to a different position, also the power receiving device can be repositioned. As a result it becomes possible to position the power receiving device on any desired position of, e.g., a desk or a wall, without requiring any wiring or rewiring. The power receiving device may be any type of electronic device, such as a battery powered portable electronic device to be charged by the power supplying device according to the invention, a lamp or a computer display.

In a preferred embodiment of the power supplying device according to the invention, the power transmitter further comprises a ferromagnetic material. When the power receiving device also comprises a ferromagnetic material (e.g. in the inductive coil) and either the power transmitter or the power supplying device are magnetic, the power receiving device can be used for pulling the power transmitter through the gap. In an embodiment of the power supplying device according to the invention, the power transmitter has one or more 'default positions' in the power supplying device. When the power supply is not used, the power transmitter returns to the default position. This return may, e.g., be realized mechanically, using gravity or using electronics. At these default positions, the power receiving device may be used to magnetically pick up the power transmitter and to pull the power transmitter towards the desired position.

In an embodiment of the power supplying device according to the invention, at least one of the plates is at least partially transparent. In such an embodiment the power transmitter does not need a default position, because its position can be observed through the plate. The user can thus easily place the power receiving device on top of the power transmitter. If the at least partially transparent layer comprises an electrode structure, an at least partially transparent conductive material may be used for said electrode structure such that the power transmitter is not obscured by the electrode structure. Indium tin oxide (ITO) or zinc oxide (ZnO) may be suitable transparent conductive materials for this purpose.

In another embodiment of the power supplying device according to the invention, at least one of the plates comprises a transmitter position indicator for indicating a position of the power transmitter relative to said at least one of the plates. For example, LEDs on the plate surface may indicate where the transmitter coil is to be found. If the plate is transparent, the position indicating LED may also be provided on the power transmitter. When the LED is part of the power transmitter, only one LED is required. Alternatively, a small display screen may be provided for showing a representation of the plate surface and the position of the power transmitter.

According to a third aspect of the invention, a power consuming system is provided, comprising a power supplying device and a power receiving device as described above.

These and other aspects of the invention are apparent from and will be elucidated with reference to the embodiments described hereinafter.

DETAILED DESCRIPTION OF THE INVENTION

Figure 1:
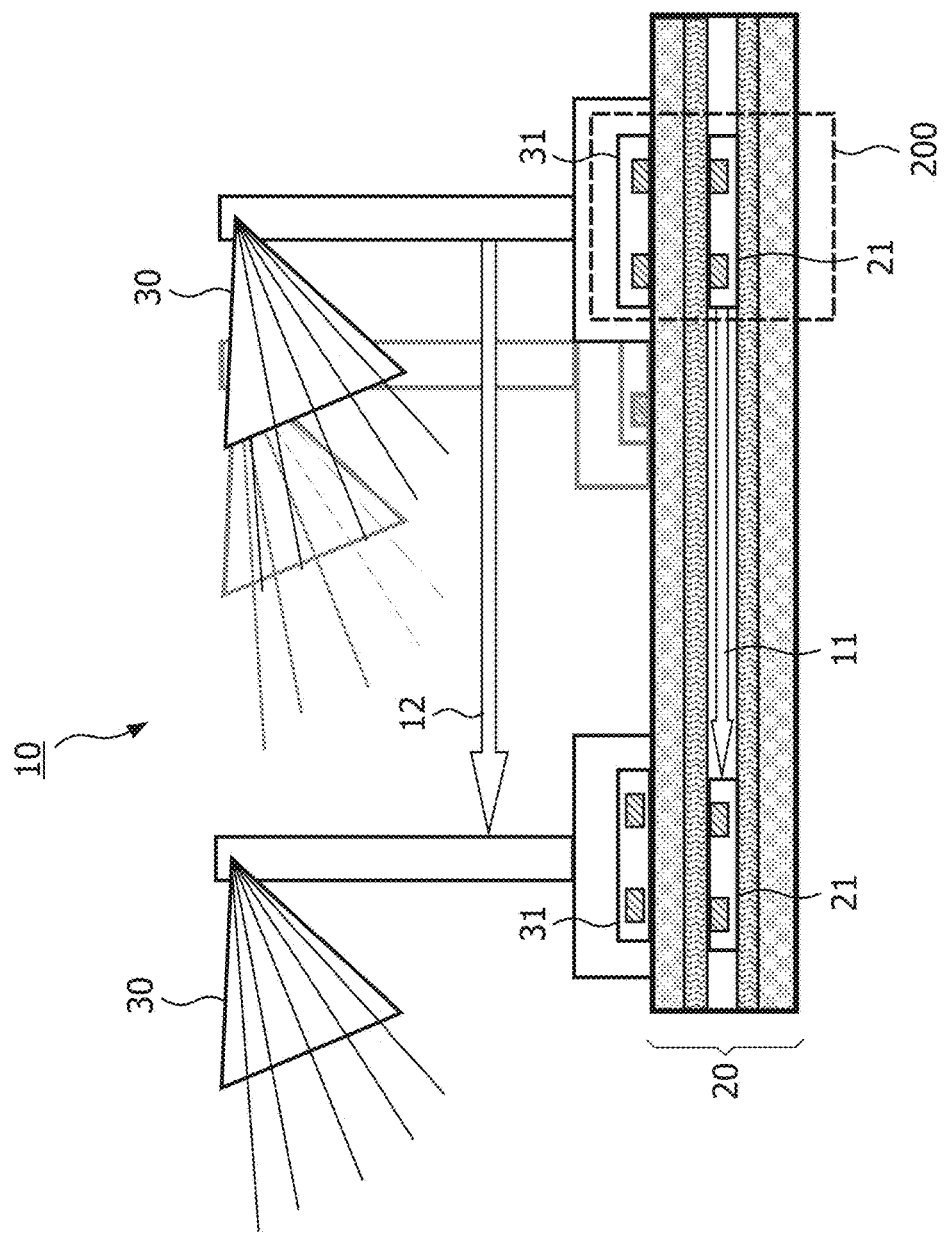
FIG. 1 schematically shows a system according to the invention.

FIG. 1 schematically shows a system 10 according to the invention. The system 10 comprises a power supplier 20 for wirelessly supplying electrical power to a lamp 30. The power supplier 20 comprises a power transmitter 21, which is coupled to an AC source (not shown) for inductively providing power to the lamp 30. The lamp 30 comprises a power receiver 31 for receiving the power provided by the power transmitter 21 and for making the lamp 30 shine.

The power transmitter 21 is located in a gap formed by two substantially parallel plates and can be moved in two directions through this gap. In this figure, a repositioning of the power transmitter 21 is indicated by an arrow 11. When the power transmitter 21 is positioned close enough to the power receiver 31 of the lamp 30, it is possible to conductively transmit power from the power supplier 20 to the lamp 30. When the lamp 30 is moved (indicated by arrow 12) to another position and the power transmitter 21 is moved (arrow 11) close to the new position of the lamp 30, the lamp 30 will keep on receiving electrical power from this power transmitter 21. Consequently, it is not necessary to provide the power supplier 20 with an array of power transmitters at different positions in order to be able to power the lamp 30 at these different positions.

It is to be noted that the lamp 30 is only used as an exemplary power receiving device. The system 10 may also be used for powering other electronic devices like notebook PCs, speakers, PC monitors or chargers for batteries or battery powered electronic devices like mobile phones. The power supplier 20 may be a separate power supplying unit, but may also be integrated in, e.g., a desk or tabletop. It is also possible to integrate the power supplier 20 in a wall.

Figure 2:
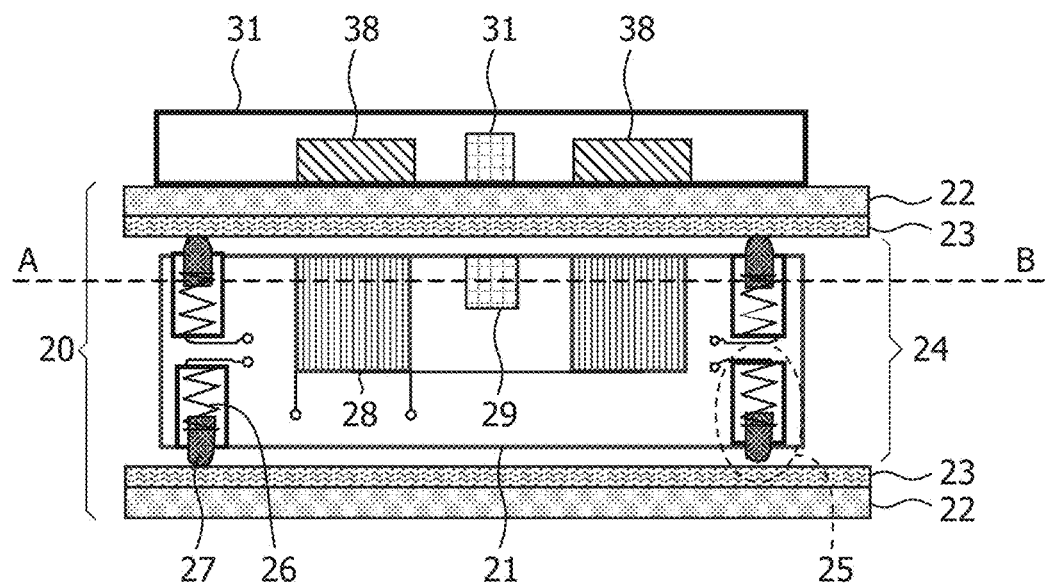
FIG. 2 shows a close-up of the system shown in FIG. 1.

FIG. 2 shows a close-up of the system 10 shown in FIG. 1. The close-up shown in FIG. 2 zooms in on the area 200 indicated by a dotted rectangle in FIG. 1. In FIG. 2 it is shown that the power supplier 20 comprises two substantially parallel plates 22, each having a conductive layer 23 functioning as an electrode for coupling the power transmitter 21 to the AC source. As will be elucidated below with reference to FIG. 8, the system 10 may also function with only one of the plates 22 having a conductive layer 23. The plates 22 may either by opaque or (partially or completely) transparent. The material(s) used for the plates 22 should have a relative permeability close to 1, in order to make it possible for the magnetic field generated by the power transmitter 21 to penetrate through the plate 22 and reach the power receiver 31. Suitable materials for the plates 22 are, e.g., wood, glass or polymethylmethacrylate (plexiglass). Suitable materials for the conductive layers 23 are, e.g., Aluminum or copper. It is an option to use only a conductive layer 23, without a non-conductive plate 22. That would however limit the applied voltages, because a human may touch the voltage carrying conductive layer 23.

Together, the two plates 22 define a gap 24 in which the power transmitter 21 is provided and through which the power transmitter 21 can be moved. The power transmitter comprises an electrically conductive coil 28 which produces an alternating magnetic field when coupled to an AC power source. The coil 28 is electrically coupled to the conductive layers 23 via sliding contacts 25. The sliding contacts 25 shown in FIG. 2 comprise an electrically conductive tip 27 for contacting the conductive plate 23 and an optional spring element 26 for ensuring a stable contact between the conductive tip 27 and the conductive layer 23. The spring elements 26 provide stability with respect to external mechanical impacts and when the power transmitter 21 is moved through the gap 24. Alternatively, the electrical coupling of the coil 28 to the conductive layer may be realized using rolling contacts (e.g. electrically conductive wheels).

The conductive layers 23 of the power supplier 20 are coupled to the AC power source (not shown). When an AC current runs through the coil 28, an alternating magnetic field is created. This alternating magnetic field induces an electrical current in a second electrically conductive coil 38 in the power receiver 31 of the power receiving device 30. This induced electrical current may be used for powering the power receiving device 30. The power transfer thus obtained is most efficient, when the receiver coil 38 is closest to the transmitter coil 28, thereby maximizing the electromagnetic coupling. Good alignment of the two coils 28, 38 may be obtained using two pieces of ferromagnetic material 29, 39 of which at least one is permanently magnetic. When not too far away from each other, the attracting magnetic force between these two pieces of ferromagnetic material 29, 39 will pull the power transmitter 21 in the direction of the power receiver 31, such that the pieces of ferromagnetic material 29, 39 are situated even closer together. The alignment of the pieces of ferromagnetic material 29, 39 also results in alignment of the transmitter coil 28 and the receiver coil 38, thereby optimizing the efficiency of the power transfer.

The moving of the power transmitter 21 through the gap 24 may be realized in many different ways. The position of the power transmitter 21 may, e.g., be adjustable via electronic or mechanical means. Preferably, the positions of the power transmitter 21 and the power receiving device are magnetically coupled and the power transmitter 21 is slid through the gap 24 by sliding the power receiving device 30 over the surface of the plate 22. In many or all possible positions of the power transmitter 21 relative to the plates 22, the sliding contacts 25 are in contact with the conductive plates 23, such that the transmitter coil 28 can be coupled to the AC source. Optionally, in at least one position of the power transmitter 21 the sliding contacts 25 are not in contact with the conductive layer 23. In such a position, the power transmitter does not consume power and the power receiving device 30 is turned off (or at least not powered by the power supplier).

Figure 3:
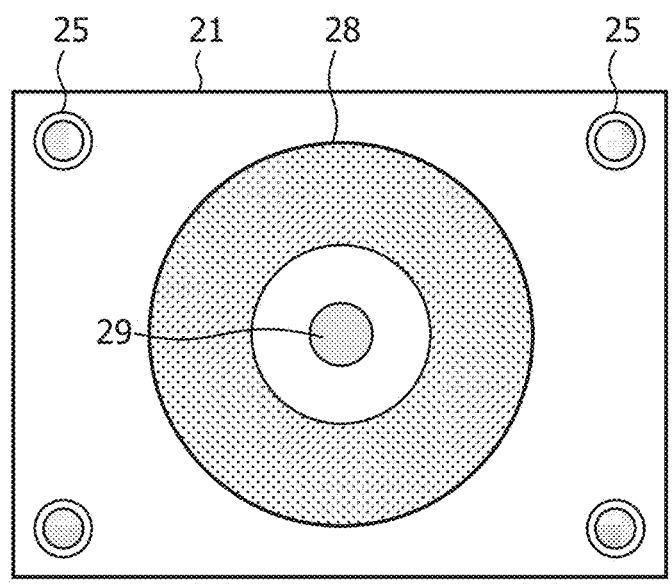
FIG. 3 shows a cross section of the part of the system shown in FIG. 2.

FIG. 3 shows a cross section of the part of the system 10 shown in FIG. 2. This cross section gives a top view of the power transmitter 21 at the height of dotted line AB in FIG. 2. In this top view, the sliding contacts 25, the transmitter coil 38 and the piece of ferromagnetic material 29 are visible.

Figure 4A:
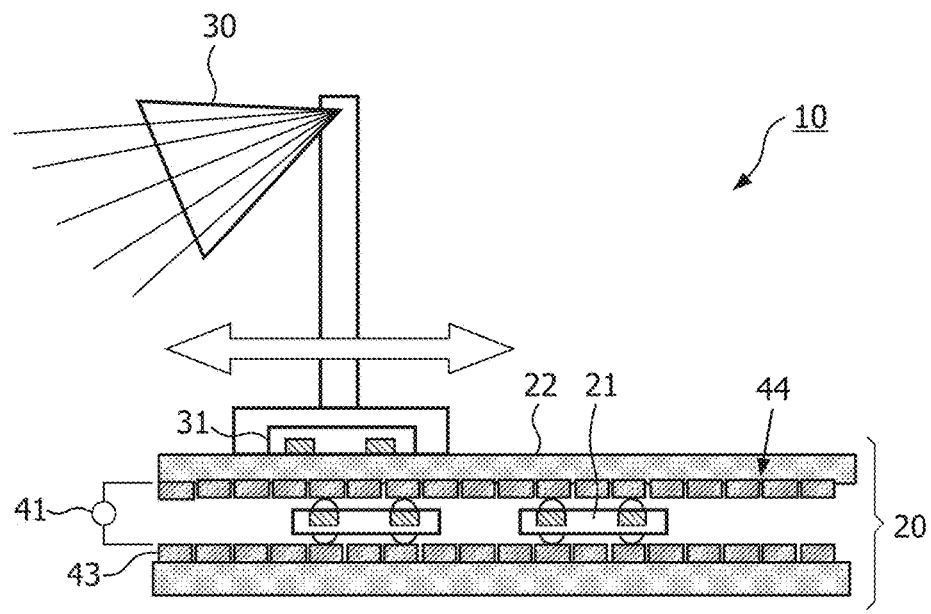
FIGS. 4a and 4b show two cross sections of a power supplying device with slotted conductive layers.
Figure 4B:
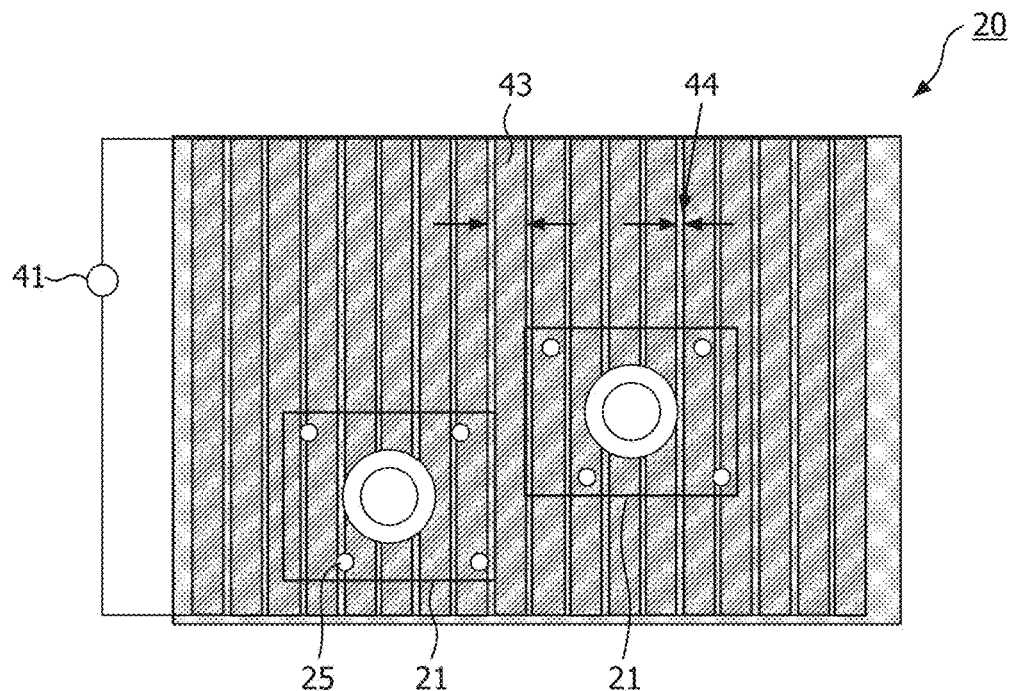

FIGS. 4a and 4b show two cross sections of a power supplying device 20 with slotted conductive layers 43. FIG. 4a shows a side view, while FIG. 4b shows a top view of the same power supplying device 20. In FIG. 4a a lot of features already described above with reference to FIGS. 1 and 2 are shown. Additionally, FIG. 4a shows an AC power source 41 which is coupled to the conductive layer 43. Instead of an uninterrupted conductive layer, this embodiment uses a slotted conductive layer 43 with strips 43 of conductive material, separated by small slots 44 without conductive material. The effect of these slots 44 is to reduce eddy currents which are induced by the magnetic field of the transmitter coil in conductive layer 43. Eddy currents lead to increased losses and a reduction of the effective transmitter-receiver coil coupling. The conductive strips 43 are connected in parallel at a border of the plate 22 and coupled to the power source 41. The influence of the slots 44 on the electrical resistance for feeding the transmitter coil 28 is negligible. An alternative or additional measure for a more efficient passage of the magnetic field through the conductive layer is the use of a very thin conductive layer. For obtaining a thin conductive layer, vacuum deposition or sputtering may be used.

Figure 5:
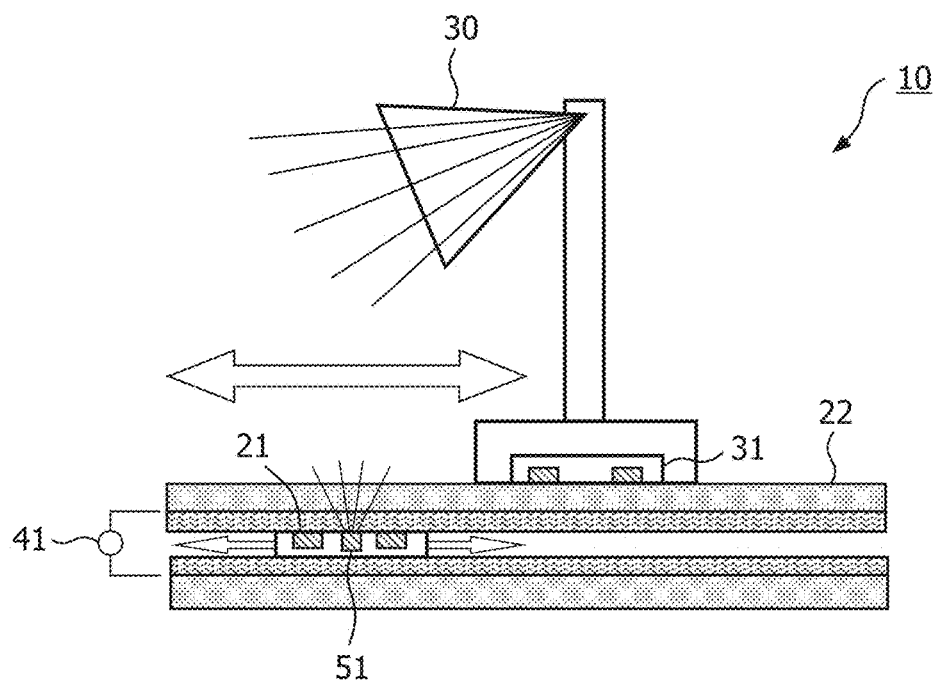
FIG. 5 shows a power supplying device with a position indicator.

FIG. 5 shows a power supplying device with a position indicator 51. When placing the lamp 30 on the surface of the plate 22, it is important to know where the power transmitter 21 is to be found. The lamp 30 will only receive power from the power transmitter 21 when placed on the plate 22, close to the power transmitter 21. Also when the user has to move the power transmitter 21 to a desired position, it is important to be able to know the current position of the power transmitter. If both the plate 22 and the conductive layer 23 are transparent, it is easy to see the position of the power transmitter 21. Indium tin oxide (ITO) and zinc oxide (ZnO) are examples of suitable materials for use in a transparent conductive layer. If either the plate 22 or the conductive layer 23 is not transparent, some kind of position indicating means are needed. For example, the power transmitter 21 may be equipped with a LED 51 or other type of light source which is able to emit light through the conductive layer 23 and the plate 22. Alternatively, position indicating LEDs on the plate surface may show the position of the power transmitter. Position detecting means may be provided for determining the position of the power transmitter 21 relative to the plates 22. When the position of the power transmitter 21 is known, a corresponding LED on the plate surface may be turned on.

Figure 6:
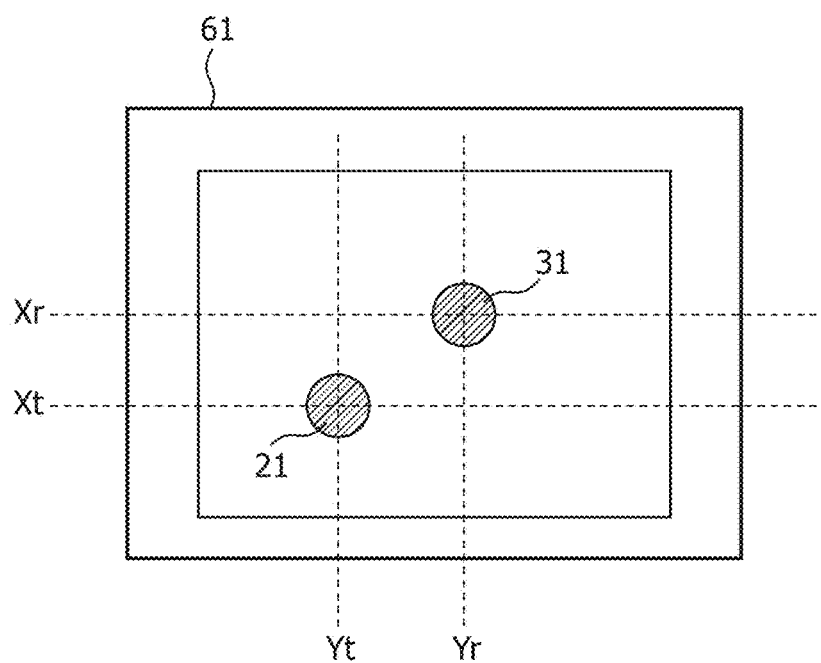
FIG. 6 shows a display screen for indicating a position of the power transmitter.

Alternatively, the position of the power transmitter 21 is shown on a separate display screen 61. FIG. 6 shows a display screen 61 for indicating a position of the power transmitter 21. The display screen 61 may be integrated in the desktop surface or wall with the power supplier 20, but it may also be provided as a separate unit. The display screen preferably shows the positions of the power transmitter 21 and the power receiving device 30 in order to make it easier to bring these units together. When relocating the power transmitter 21 or the power receiving device 30, the display screen 61 can be used for determining where to put them.

Figure 7:
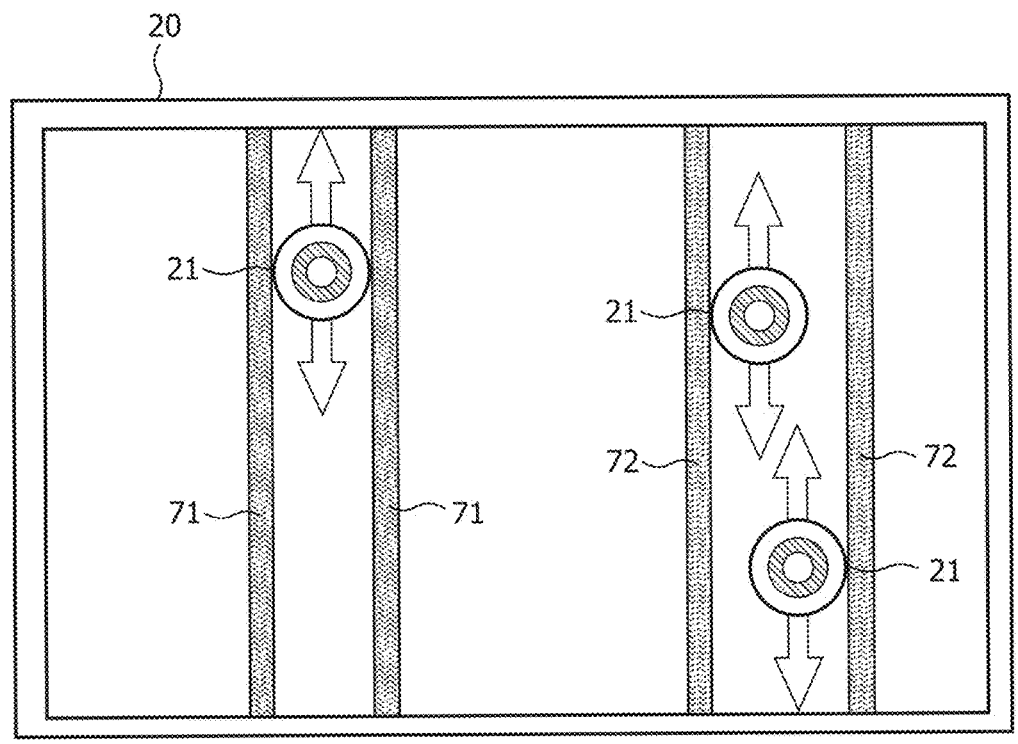
FIG. 7 shows a cross section of a power supplying device with guided movable power transmitters, FIG. 8 schematically shows a grid layout that may be used in a power supplying device in which only one plate comprises a conductive layer.

FIG. 7 shows a cross section of a power supplying device 30 with guided movable power transmitters 21. In many applications, it will be desirable to allow the power transmitter 21 to move freely in two dimensions. However, for esthetic or practical reasons, it may also be desirable to limit the freedom of movement for the power transmitter 21 (and thus also for the power receiving device 30). The power supplier 20 shown in FIG. 7 comprises guiding means 71, 72 for limiting the freedom of movement of the power transmitters 21.

Figure 8:
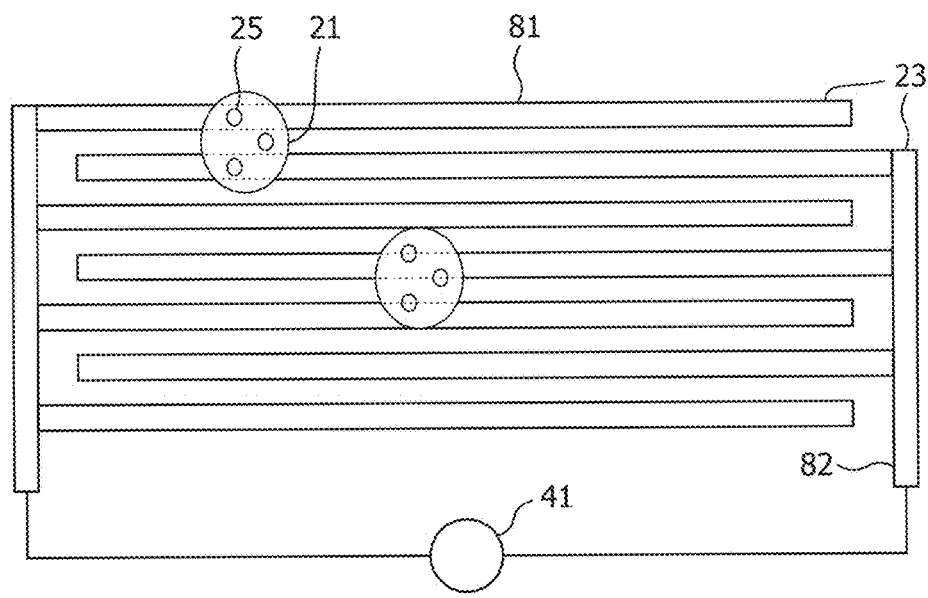

FIG. 8 schematically shows a grid layout that may be used in a power supplying device 20 in which only one plate 22 comprises a conductive layer 23. For supplying an AC voltage to the transmitter coil 28 of the power transmitter 21, two sliding contacts 25 of the power transmitter 21 must be coupled to different terminals of the AC power source 41. The easiest way to do so is to use a two plates configuration as described above in which an electrical contact 25 at one side of the power transmitter 21 is in contact with a first conductive layer 23 on a first plate 22 and a second electrical contact 25 on the opposite site of the power transmitter 21 is in contact with a second conductive layer 23 on a second plate 22. With the grid layout shown in FIG. 8, it is also possible to use only one conductive layer 23. The conductive layer 23 comprises two electrically separated electrode structure 81, 82. Each electrode 81, 82 is coupled to one of the terminals of the AC power source 41. In this embodiment, the power transmitter 21 has three sliding contacts 25 at the side facing the conductive layer 23. The contacts 25 are smaller than the space between the two electrodes 81, 82 to avoid the risk of one contact 25 short circuiting both electrodes 81, 82. Additionally, the arrangement of the three sliding contacts 25 on the power transmitter 21 is such that irrespective of the orientation of the power transmitter, always one or two contacts 25 are in contact with each one of the electrodes 81, 82.

Figure 9:
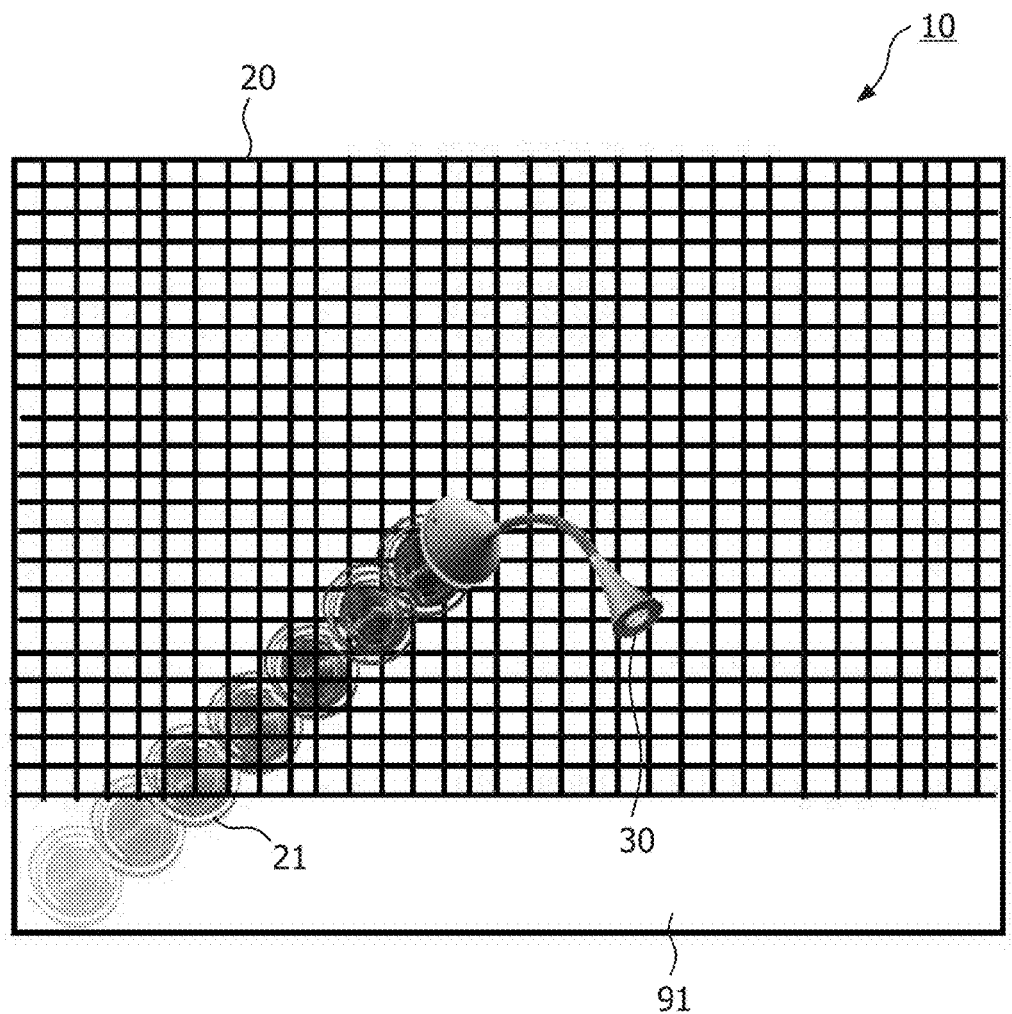
FIGS. 9 and 10 show a lighting system taking advantage of the current invention.
Figure 10:
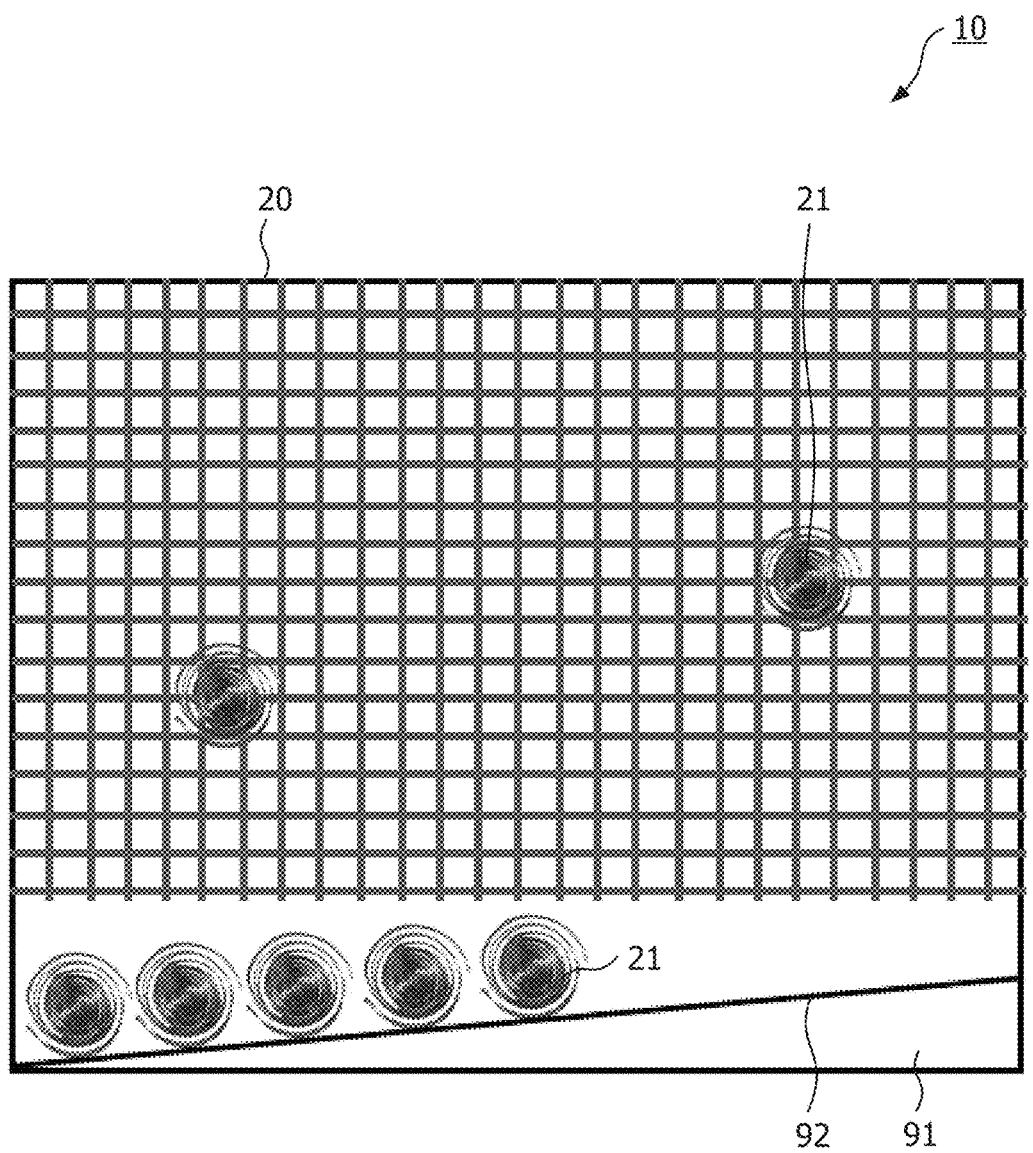

FIGS. 9 and 10 show a lighting system 10 taking advantage of the current invention. The power supplier 20 of the system 10 of FIGS. 9 and 10 may be attached to a wall or may form a wall itself. The power supplier 20 may either use a two plates configuration as shown in FIG. 1, 2, 4 or 5 or a one layer conductive grid layout as shown in FIG. 8. The lighting system 10 comprises one or more lamps 30 which can be attached to the wall. The lamp 30 may, e.g., be attached to the wall using magnetic forces between a magnet in the lamp 30 and ferromagnetic material of the conductive layer 23 and or between a magnet in the lamp 30 and ferromagnetic material in a power transmitter 21 coupled to the lamp 30. In this embodiment, not the whole surface of the power supplier 20 is covered with a conductive layer 23. At the bottom, a power free zone 91 is provided where no conductive layer 23 is present. When the power transmitter 21 is in this power free zone, it is not coupled to the AC power source and will not consume any power. When a lamp 30 is to be attached to the wall, the user picks up a power transmitter 21 in the power free zone 91. When the lamp 30 is slid over the wall surface, the power transmitter 21 will follow the lamp 30, e.g. due to magnetic forces. When the sliding contacts 25 of the power transmitter 21 reach the conductive layer 23, the transmitter coil 28 is coupled to the power source and the lamp 30 will receive the transmitted power and can be turned on. The lamp 30 may be placed at every position on the wall where the conductive layer 23 is present. When the lamp 30 is removed from the wall, the power transmitter 21 will fall down towards the power free zone 91. It is an advantage of this embodiment that it saves energy by decoupling the transmitter coil 28 from the conductive layer 23 when the power transmitter 21 is not used.

FIG. 10 shows a further embodiment of the wall system 10 of FIG. 9. Here the system 10 comprises multiple, e.g. six, power transmitters 21. A rail or slope 92 is provided in the power free zone 91. This slope 92 leads power transmitters 21 falling down to the power free zone 91 towards one of the corners of the systems 10. This corner functions as a standard pick up point for power transmitters 21. Also when the surface of the power supplier 20 is opaque and the power transmitters 21 are not visible, the user knows that a power transmitter 21 can be picked up at the standard pick up point. When a first lamp 30 is used to pick up a first power transmitter 21, the next power transmitter 21 will roll down to the standard pick up point.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A power receiving device, comprising at least one power receiver that includes an electrically conductive coil for obtaining electrical power from a power supplying device, the power supplying device comprising:
   two plates; and
   at least one power transmitter situated in between the two plates and comprising an electrically conductive coil, the plates and the power transmitter being arranged such that the power transmitter is movable in a direction parallel to the surfaces of the plates, wherein two electrode structures are arranged to be coupled to an AC power source, each electrode structure being attached to one of said two plates, at least two electrical contacts being coupled to the electrically conductive coil, the electrical contacts being in contact with the respective two electrode structures for obtaining power from the AC power source.

2. A power consuming system, comprising:
   a power supplying device comprising:
      two plates; and
      at least one power transmitter situated in between the two plates and comprising an electrically conductive coil, the plates and the power transmitter being arranged such that the power transmitter is movable in a direction parallel to the surfaces of the plates, wherein two electrode structures are arranged to be coupled to an AC power source, each electrode structure being attached to one of said two plates, at least two electrical contacts being coupled to the electrically conductive coil, the electrical contacts being in contact with the respective two electrode structures for obtaining power from the AC power source; and
   a power receiving device that includes an electrically conductive coil for obtaining electrical power from the power supplying device.

* * * * *